United States Patent [19]

Stark et al.

[11] 4,176,164

[45] * Nov. 27, 1979

[54] TREATMENT OF SULFUR OXIDES WITH AQUEOUS GLYOXYLIC ACID SOLUTIONS

[75] Inventors: William H. Stark, Cincinnati, Ohio; Cheng-Hsien Chu, Etobicoke, Canada

[73] Assignee: Spring Chemicals Limited, Toronto, Canada

[*] Notice: The portion of the term of this patent subsequent to Sep. 19, 1995, has been disclaimed.

[21] Appl. No.: 819,136

[22] Filed: Jul. 26, 1977

Related U.S. Application Data

[63] Continuation-in-part of Ser. No. 717,082, Aug. 24, 1976, Pat. No. 4,115,517.

[51] Int. Cl.$^2$ .................... C01B 17/00; C01F 11/46
[52] U.S. Cl. .................... 423/243; 423/166
[58] Field of Search ............ 423/242, 243, 244, 539, 423/166

[56] References Cited

U.S. PATENT DOCUMENTS

| | | | |
|---|---|---|---|
| 3,350,165 | 10/1967 | Marchequt et al. | 423/243 |
| 4,040,803 | 8/1977 | Atsukawa et al. | 423/242 |

FOREIGN PATENT DOCUMENTS

| | | | |
|---|---|---|---|
| 443314 | 2/1936 | United Kingdom | 423/243 |
| 538602 | 8/1941 | United Kingdom | 423/242 |

*Primary Examiner*—O. R. Vertiz
*Assistant Examiner*—Gregory A. Heller
*Attorney, Agent, or Firm*—Burns, Doane, Swecker & Mathis

[57] ABSTRACT

Aqueous glyoxylic acid solution is used to absorb sulfur dioxide and sulfur trioxide from a gaseous stream and the absorbed sulfur dioxide being removed from the aqueous glyoxylic acid solution by stripping and the absorbed sulfur trioxide being thereafter removed from the stripped glyoxylic acid solution. In a preferred embodiment, the absorbed sulfur trioxide is removed from the stripped glyoxylic acid solution by precipitation as barium sulfate. Particularly, sulfuric acid or absorbed sulfur trioxide in aqueous glyoxylic acid solutions may be removed by contacting the aqueous glyoxylic acid solutions with a barium compound such as barium hydroxide which is substantially inert to the glyoxylic acid but which precipitates barium sulfate from the aqueous glyoxylic acid solution.

2 Claims, 1 Drawing Figure

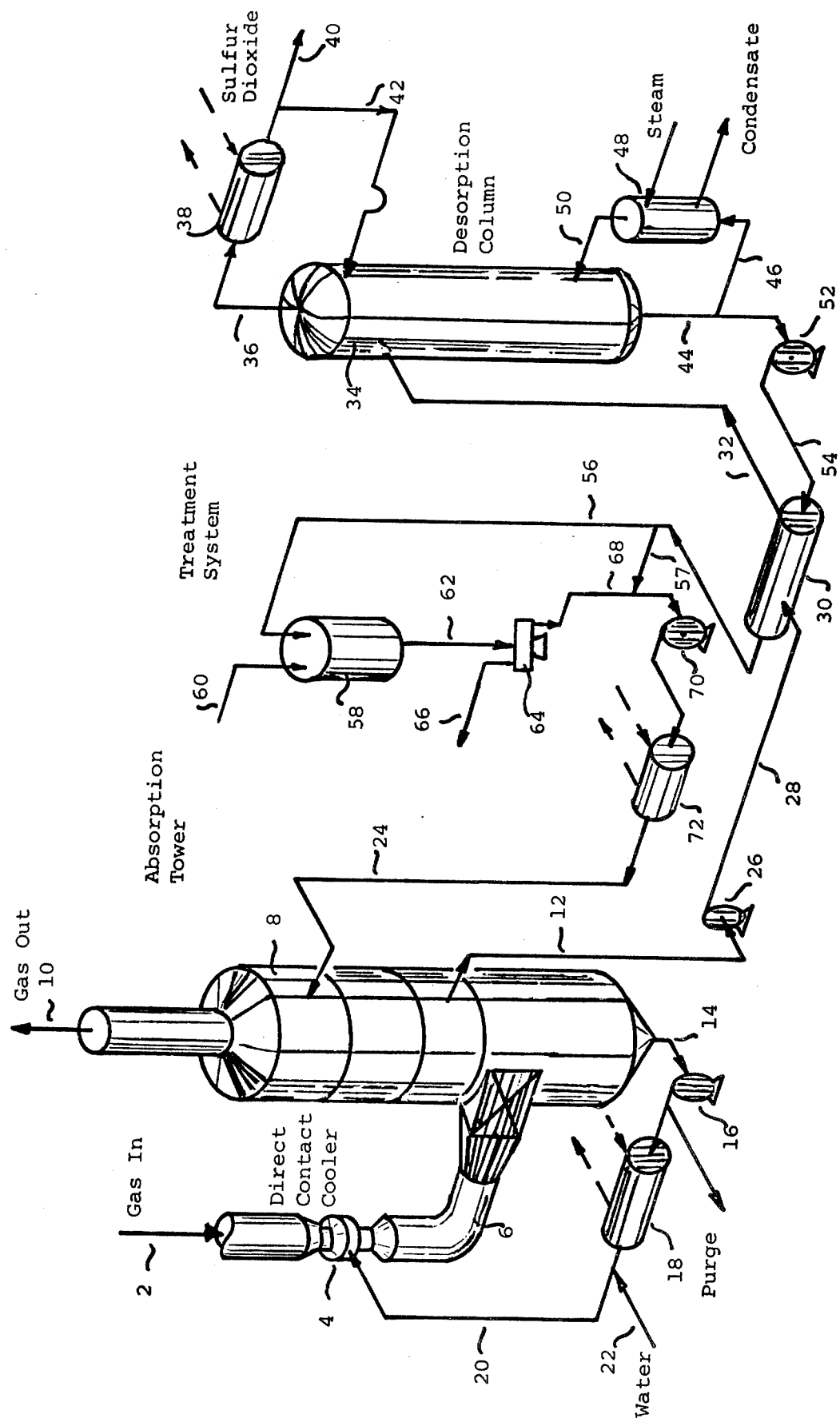

TREATMENT OF SULFUR OXIDES WITH AQUEOUS GLYOXYLIC ACID SOLUTIONS

CROSS-REFERENCE TO RELATED APPLICATIONS

This is a continuation-in-part of copending application Ser. No. 717,082, filed Aug. 24, 1976 now U.S. Pat. No. 4,115,517.

BACKGROUND OF THE INVENTION

1. Field of the Invention

This invention relates to the removal of sulfur dioxide and sulfur trioxide from gaseous streams. In another aspect, this invention relates to the treatment of aqueous glyoxylic acid solutions. More particularly, this invention relates to processes for the removal of sulfuric acid or absorbed sulfur trioxide from aqueous glyoxylic acid solutions, and to processes for the removal of sulfur dioxide and sulfur trioxide from industrial flue gases using aqueous glyoxylic acid solution as an absorbent.

2. Summary of the Prior Art

The use of sulfur-containing fossil fuels as power sources results in effluent gases containing a number of noxious environmental pollutants, among which are sulfur dioxide and to a lesser extent sulfur trioxide. Similarly, tail gases from sulfuric acid production processes also contain objectionable amounts of sulfur dioxide and sulfur trioxide. A host of solutions to this problem has been proposed. The non-regenerative methods involve absorbing and/or reacting the sulfur oxides with inorganic reagents, e.g. alkaline carbonates or hydroxides, in slurry or solution to yield the corresponding sulfite and sulfate salts. Such non-regenerative gas treating systems, however, are characterized by high costs due to the continuing chemical consumption and the high transportation costs required for continually bringing the chemicals to the plant site and the disposal costs for continually removing the sludge formed. See, for example, U.S. Pat. No. 3,632,306.

Other general methods suggested for the selective removal of sulfur dioxide and sulfur trioxide from effluent gases utilize absorbents which can be regenerated, such regeneration offering significant advantages economically over non-regenerative processes.

Such regenerative absorbent systems include inorganic systems such as sodium solution processes and magnesium slurry processes. Regenerative organic bases, e.g. amines, have also been suggested as absorbents. See, for example, U.S. Pat. Nos. 3,047,364 and 3,904,735. A different class of absorbent has also been proposed, namely aqueous solutions of glyoxylic acid. See, for example, U.S. Pat. No. 3,350,165. It will be noted that this U.S. Pat. No. 3,350,165 states that aqueous solutions of glyoxylic acid perform, in addition to a good absorbent role for sulfur dioxide, the role of an oxidation inhibitor with respect to the sulfur dioxide, such that the formation of sulfuric acid is inhibited. Even so, it has been found that, because most industrial flue gases containing sulfur dioxide also contain sulfur trioxide, that sulfur trioxide is also absorbed by the aqueous glyoxylic acid solution, thus in fact creating sulfuric acid in the system. The sulfuric acid remains in the aqueous glyoxylic acid solution after stripping of the sulfur dioxide from the aqueous glyoxylic acid solution. Unless removed, the concentration of sulfuric acid in the absorbent will increase to an intolerable level, causing corrosion of the equipment and degradation of absorbent.

SUMMARY OF THE INVENTION

Accordingly, a primary object of the present invention is to provide novel processes for preventing or substantially alleviating the problems of the prior art as discussed above.

Another more particular object of the present invention is to provide a process for the removal of sulfuric acid or absorbed sulfur trioxide from aqueous glyoxylic acid solutions.

Another more particular object of the present invention is to provide novel processes for the removal of sulfur dioxide and sulfur trioxide from industrial gases.

In accordance with one aspect of the present invention, a process is provided for the removal of sulfur dioxide and sulfur trioxide from industrial gases by employing an aqueous solution of glyoxylic acid as an absorbent; regenerating the absorbent by stripping off at least part of the absorbed sulfur dioxide, and then removing the absorbed sulfur trioxide or sulfuric acid from the stripped absorbent.

In accordance with another aspect of the present invention, a process is provided for the removal of sulfuric acid or absorbed sulfur trioxide from aqueous glyoxylic acid solutions, which process involves contacting aqueous glyoxylic acid solution containing sulfuric acid or absorbed sulfur trioxide with a barium compound more soluble than barium sulfate in the glyoxylic acid solution, the barium compound being substantially inert to the glyoxylic acid and being present in an amount effective to precipitate barium sulfate from the aqueous glyoxylic acid solution, and removing the barium sulfate precipitate from the aqueous glyoxylic acid solution.

In another aspect of the present invention, a process is provided for the extraction of sulfur dioxide and sulfur trioxide from gases containing sulfur dioxide and sulfur trioxide, which process involves contacting the gas with an aqueous solution of glyoxylic acid to absorb sulfur dioxide and sulfur trioxide in the aqueous solution, removing at least part of the sulfur dioxide from the aqueous glyoxylic acid solution by heating to strip the sulfur dioxide as a vapor from the aqueous glyoxylic acid solution, and thereafter removing absorbed sulfur trioxide by contacting the aqueous glyoxylic acid solution with an inorganic barium compound such as barium hydroxide or barium carbonate, the barium compound being essentially inert to the glyoxylic acid and being present in an amount effective to precipitate barium sulfate from the aqueous glyoxylic acid solution.

In another aspect of the present invention, a process is provided for the removal of sulfur dioxide and sulfur trioxide from hot industrial effluent gases for discharge to the atmosphere, which process consists essentially of:

(a) passing industrial gas at a temperature between about 70° C. and about 250° C. and containing from about 0.2% to about 2% sulfur dioxide and from about 0.002% to about 0.1% sulfur trioxide to a cooling zone to cool the gas to a temperature between about 20° C. and about 40° C.;

(b) passing the cool gas through an absorber at a temperature between about 20° C. and about 40° C. and in countercurrent contact with an absorbent composition stream consisting essentially of from about 10% to about 25% glyoxylic acid and correspondingly from about 90% to about 75% water;

(c) absorbing sulfur dioxide and sulfur trioxide in the absorbent composition;

(d) heating the absorbent composition containing absorbed sulfur dioxide and sulfur trioxide to a temperature of between about 60° C. and about 80° C.;

(e) passing the heated absorbent composition to a stripping zone and stripping sulfur dioxide as a vapor from the absorbent stream;

(f) removing from the stripping zone stripped aqueous glyoxylic acid solution consisting essentially of about 0.001% to about 2% sulfuric acid, about 1% to about 3% absorbed sulfur dioxide, about 10% to about 25% glyoxylic acid and from about 90% to about 70% water;

(g) contacting the stripped aqueous glyoxylic acid solution containing the sulfuric acid with barium hydroxide, the barium hydroxide being essentially inert to the glyoxylic acid and being present in an amount such that the molar ratio of barium ion in solution to sulfate ion in solution is between about 0.7 and about 0.9:1 and effective to precipitate essentially only barium sulfate from the aqueous glyoxylic acid solution;

(h) centrifuging the barium sulfate precipitate from the aqueous glyoxylic acid solution; and (i) passing aqueous glyoxylic acid solution having the barium sulfate separated therefrom to the absorber of step (a) above.

A central feature of certain aspects of the present invention is the discovery of the unique selectivity of barium compounds such as barium hydroxide to selectively remove through precipitation essentially all sulfate ion from aqueous solutions of glyoxylic acid which may contain not only sulfuric acid but also some absorbed sulfur dioxide. Such selectivity is surprising in view of, for example, calcium compounds such as calcium hydroxide which at about room temperature will not precipitate sulfate ion as calcium sulfate from such aqueous glyoxylic acid solutions. Moreover, it was thought that strongly alkaline materials may precipitate not only sulfate but also sulfite, glyoxylate or glyoxylate-containing compounds, for the mechanism by which glyoxylic acid solution retains sulfur oxides remains somewhat obscure.

Other objects, aspects and advantages of the present invention will become apparent to one skilled in the art in view of the following description of the preferred embodiments, when read in conjunction with the drawing.

BRIEF DESCRIPTION OF THE DRAWING

The DRAWING is a schematic perspective view of a preferred embodiment of an absorbent-regenerative process for removing sulfur dioxide and sulfur trioxide from an industrial gas.

DESCRIPTION OF THE PREFERRED EMBODIMENTS

As indicated above, the present invention involves the ability of an aqueous solution of glyoxylic acid to absorb both sulfur dioxide and sulfur trioxide from a gaseous stream. The term "aqueous solution of glyoxylic acid" or "aqueous glyoxylic acid solution" in the present specification is intended to include both pure solutions of glyoxylic acid in water and solutions of glyoxylic acid in water containing absorbed sulfur dioxide and sulfur trioxide. To regenerate the absorbent, both the sulfur dioxide and the sulfur trioxide should be at least partly removed. If allowed to remain in the absorbent, the sulfur dioxide may preclude the absorption of more sulfur dioxide, while the sulfur trioxide, as sulfuric acid, would tend to corrode the equipment. Moreover, the presence of even a small amount of sulfuric acid tends to reduce the capacity of the glyoxylic acid solution to absorb sulfur dioxide. It is thought that, for example, the presence of only 12% sulfuric acid reduces the sulfur dioxide capacity of the glyoxylic acid solution by almost 40% after eight absorption and desorption cycles.

It can be seen that the removal of sulfur dioxide and particularly sulfur trioxide from the absorbent may be essential to the efficient operation of the process. It has been found, however, that both of the absorbed gases cannot be removed in a single step. The stripping technique disclosed in U.S. Pat. No. 3,350,165 serves to remove a substantial portion of the absorbed sulfur dioxide from the glyoxylic acid solution but it does not remove the absorbed sulfur trioxide. Hence, a second separation step is required.

One method of effecting such a separation involves passing the stripped glyoxylic acid solution to a column containing an anion exchange resin whereby the sulfuric acid which results from the absorbed sulfur trioxide is separated from the absorbent.

A second method, which represents another aspect of the present invention and which is discussed below, involves the addition of certain barium compounds to the stripped glyoxylic acid solution to remove the absorbed sulfur trioxide as a barium sulfate precipitate. Other methods which may become apparent to those skilled in the art from the teachings herein may also be employed to remove the absorbed sulfur trioxide from the stripped glyoxylic acid solution.

As indicated above, the present invention involves removal of sulfuric acid or absorbed sulfur trioxide from aqueous glyoxylic acid solutions. Such aqueous glyoxylic acid solutions may contain varying amounts of glyoxylic acid, sulfuric acid, water and minor amounts of other noninterfering constituents including absorbed sulfur dioxide. For example, such aqueous glyoxylic acid solutions may comprise from about 5% to about 50%, and more typically from about 10% to about 25% glyoxylic acid and from about 0.001% to about 10%, typically from about 0.05% to about 10% and more typically from about 0.2% to about 2% sulfuric acid. Although in a preferred embodiment the sulfuric acid is present mainly through absorption of sulfur trioxide, other sources of sulfuric acid in aqueous glyoxylic acid solutions are also contemplated.

As noted above, the aqueous glyoxylic acid solution may contain sulfur trioxide absorbed from gases, particularly industrial gases such as tail gases from sulfuric acid production, or industrial effluent or flue gases from sulfur-containing fossil fuel burning power plants or stack gases from other industrial operations. For example, such industrial gases may contain from about 0.02% to about 20%, more typically about 0.1% and about 5%, and even more typically from about 0.2% to about 2% sulfur dioxide, and from about 0.001% to about 1%, more typically from about 0.002% to about 0.1%, sulfur trioxide. The remaining gases are typically at least one selected from the group consisting of oxygen, nitrogen, oxides of nitrogen, oxides of carbon, and mixtures thereof, including water vapor.

A barium compound which is more soluble than barium sulfate in the glyoxylic acid solution and which is substantially, or essentially inert to the glyoxylic acid, is used to precipitate barium sulfate from the above described aqueous glyoxylic acid solutions. The term "substantially, or essentially inert" is used herein to mean that the barium compound does not precipitate or degrade the glyoxylic acid or strongly complex the glyoxylic acid so as to destroy or substantially lessen the sulfur dioxide absorbing properties. Of course, if barium carbonate is used, the acidic nature of the aqueous solution will cause the carbonate ion to break down into carbon dioxide and water. Such barium compounds include inorganic barium salts such as barium hydroxide and barium carbonate. Barium chloride may also be used, particularly if chloride ion is subsequently removed, as by conventional ion-exchange techniques. Barium hydroxide is particularly preferred insofar as it will form a ready precipitate which may be conveniently removed by decantation, centrifugation or filtration.

The barium compound is typically contacted with the aqueous glyoxylic acid solution in amounts of barium compound effective to precipitate barium sulfate from the aqueous glyoxylic acid solution. The molar ratio of barium to sulfate ion solution may vary widely, although a significant excess of barium may not be desired in so far as it would remain in the glyoxylic acid solution. For example, molar ratios of barium to sulfate ion in solution may vary from about 0.1:1 to about 2:1, more typically from about 0.5:1 to about 1:1, and preferably from about 0.7:1 to about 0.9:1.

The barium compound may be contacted with the glyoxylic acid at any convenient temperature. For example, the barium compound may be contacted with the glyoxylic acid at temperatures of from above the freezing point to the boiling temperature, which may vary depending upon pressure and particular composition of the solution. More typically, temperatures may be from about 20° C. to about 80° C., and preferably from about 30° C. to about 50° C.

Atmospheric, superatmospheric or subatmospheric pressures may be used, with atmospheric pressure being convenient. Also, the barium compound may be contacted with the glyoxylic acid in a stirred or non-stirred reactor or reaction zone, and on a continuous, semi-continuous or batch basis.

Generally, the process for removing sulfur oxides from gases involves an absorption-desorption technique. See, for example, U.S. Pat. No. 3,350,165, which is incorporated herein by reference.

In a preferred embodiment of the present invention, an overall process for the removal of sulfur dioxide and sulfur trioxide from industrial gases may involve (referring to the DRAWING) passing industrial gas in a conduit or line 2 at a temperature between about 50° C. and about 1000° C. to a cooling zone 4 to cool the industrial gas to a temperature between about 20° C. and about 40° C., or typically between about 30° C. and about 40° C. The cooling zone 4 may comprise a direct contact cooler wherein cooling water may be passed or admixed directly into the hot gas. The cold gas may then be passed through a line 6 to an absorption zone 8, typically in countercurrent contact, with an absorbent composition stream consisting essentially of the aqueous glyoxylic acid solution. This absorption zone is maintained at a temperature and pressure profile such that the sulfur dioxide and sulfur trioxide will be absorbed by a countercurrent glyoxylic acid solution fed to the absorber 8 via a line 24. Such liquid-gas countercurrent absorption operations are, in general, well-known. See, for example, Perry's Chemical Engineers Handbook, 4th Edition (McGraw Hill 1969), which is incorporated herein by reference for purposes of brevity and clarity. Industrial gas having sulfur oxides removed therefrom are passed out of the top of the absorber 8 via a line 10. Water may be removed from the bottom of the absorber 8 via a line 14 and a pump 16 and recycled back to the cooler 4 via a line 20. Make-up water may be added as needed via a line 22. After absorption, the absorbent composition may then be passed from the absorber 8 via a line 12 and a pump 26 to a countercurrent heat exchanger 30 for heating to a temperature between about 60° C. and about 80° C. The heated stream may then be passed via a line 32 to a stripping or desorption zone or unit 34, so that sulfur dioxide may be stripped as a vapor from the absorbent stream. The stripping step will remove a significant portion of the absorbed sulfur dioxide, but it typically will not serve to remove all of the absorbed sulfur dioxide, thus, as used in the present specification, the term "stripped aqueous glyoxylic acid solution" refers to a solution of glyoxylic acid, water, absorbed sulfur trioxide and residual amounts of absorbed sulfur dioxide as indicated hereinabove. Suitable temperature and pressure profiles within the stripping zone will be within the skill of one skilled in the art in view of the present specification. Typically, such temperatures vary from about 80° C. under slight vacuum to about 105° C. at about atmospheric pressure. See, also, for example, U.S. Pat. No. 3,350,165 incorporated by reference above. From the desorption column 34 water vapor and sulfur dioxide gas may be passed via line 36 to a water-cooled condenser 38, with sulfur dioxide gas then being recovered via line 40 and water being recycled via line 42 to the column 34. The stripped aqueous glyoxylic acid solution when removed from the stripping zone 34 via a line 44 may consist essentially of about 0.001% to about 2%, more typically about 0.05% to about 2% sulfuric acid, about 1% to about 3% absorbed sulfur dioxide, about 10% to about 25% glyoxylic acid and from about 90% to about 70% water. A portion of this stream may be passed via line 46 to a reboiler 48 and via a line 50 back to the column 34. This stripped aqueous glyoxylic acid solution via a pump 52 and a line 54 may be passed through the heat exchanger 30 for cooling to between about 30° C. and about 50° C., and then to a treatment tank 58. The stripped solution in the treatment tank 58 is then contacted or admixed with barium hydroxide, preferably barium hydroxide in solid particulate form. The barium hydroxide may be added to the tank 58 via a line 60.

Upon precipitation in the tank 58, the barium sulfate may be removed from the aqueous glyoxylic acid solution by passing the solution and precipitate via a line 62 to a centrifuge 64, with the precipitate being removed via line 66 from the centrifuge 64. The aqueous glyoxylic acid solution having the barium sulfate separated therefrom may be passed via a line 68, a pump 70 and a line 24 back to the initial absorption zone 8. If desired, a portion of the stripped solution may bypass the treatment tank 58 and via a line 57 be passed directly to the absorption zone. If treatment tank 58 is operated on a semi-continuous or batch basis, then all of the stripped solution may be passed via line 57 directly to the absorption zone. A heat exchanger 72 may be provided to cool the glyoxylic acid solution to a temperature between about 30° C. and about 40° C. Fresh glyoxylic acid solution may be added as make-up as may be desired.

The present invention is further illustrated by the following examples all parts and percentages in the examples as well as in the other parts of the specification and claims are by weight (except that the percentages of components in industrial gases given above are by volume and on a dry basis) or unless otherwise specified.

EXAMPLES 1-9

Aqueous solutions (A) containing twenty percent glyoxylic acid, HOOC-CHO, were prepared by mixing at about 25° C. 240 parts by weight of fifty percent aqueous glyoxylic acid and 360 parts by weight water. Aqueous solutions (B) containing twenty percent glyoxylic acid and absorbed sulfur dioxide were prepared by bubbling at about 25° C. sulfur dioxide gas through 400 parts of the twenty percent glyoxylic acid solutions (A) until the total weight of solution with absorbed sulfur dioxide was about 410 parts. To the solutions (B) containing the glyoxylic acid and absorbed sulfur dioxide was added sulfuric acid at levels of 0.5%, 1% and 2% (Solutions C). Various barium compounds were then added to solutions A, B and C above by admixing the compounds in solid particulate form at about 35° C. and at a mole ratio of Ba:$SO_4$ of about 0.9:1 until all of the barium compounds dissolved. For solutions A and B, no precipitation was observed. For solution C, immediate heavy precipitates of barium sulfate were observed. The precipitates were filtered from the glyoxylic acid solution and dried at 105° C. for 10 hours and then ignited at 870° C. Other data and results are shown in the table below.

The oven dried and the ignited precipitate weights are all somewhat higher than the expected yield based on the sulfuric acid content and the barium addition. Ignition losses were from 3.5 to 9.1%. These differences may be attributable in part to experimental error and in part to the formation of other barium compounds.

ucts of aliphatic polyamines with formaldehyde, alkyl dihalogenides or epichlorohydrin. Such anion-exchanging resins are in general, known. See, for example, Kirk-Othmer Encyclopedia of Chemical Technology, (Interscience 1952), which is incorporated herein by reference for purposes of brevity and clarity. The technique employed is also, in itself, well-known, and includes these two phases:

fixation of the sulfuric acid by the basic resin;
elution from the glyoxylic acid solution of the interstitial volume;
regeneration of the resin.

In the sulfuric acid fixation phase, the percolation rate must be rather slow, i.e., on the order of 2 to 3 volumes of glyoxylic solution per volume of resin per hour. The percolation is typically halted when the resin is saturated, that is, when sulfuric acid appears in the effluent. The relatively low percentages of $H_2SO_4$ in typical solutions make it possible to percolate the desorbed glyoxylic solution directly, with no need to dilute it, which allows subsequent reutilization of this solution without having to concentrate it.

The glyoxylic solution remaining in the interstitial volume and having a low sulfuric acid content is evacuated with as small a volume of water as possible; the effluent obtained is either percolated onto the regenerated resin at the start of the next operation, or combined, since its $H_2SO_4$ content is low, with the glyoxylic solution rid of $H_2SO_4$, i.e., with the foregoing effluent.

The regeneration of the resin may, for example, occur by percolation of a 5% solution of sodium carbonate at about 2.5 volumes of carbonate solution per volume of resin, thereupon the resin is washed with bipermuted water until the pH of the effluent is from 7 to 7.5, which requires about 6 volumes of wash water per volume of resin; finally, the resin is raised by a stream of ascending water and then allowed to settle, at which time it is ready for the processing of another glyoxylic solution containing sulfuric acid.

| | | | Barium Addition | | $BaSO_4$ Precipitate | |
|---|---|---|---|---|---|---|
| Ex. No. | Solution "B" gm | $H_2SO_4$ Addition gm | Compound, 100% | Basis gm | (105° C./10 hr.) gm | (ignited @ 870° C.) gm |
| 1 | 50.0 | 0.50 | $Ba(OH)_2 \cdot 8H_2O$ | 1.547 | 1.228 | 1.180 |
| 2 | 50.0 | 0.25 | " | 0.773 | 0.674 | 0.644 |
| 3 | 50.0 | 1.00 | " | 3.094 | 2.467 | 2.380 |
| 4 | 50.0 | 0.25 | $BaCO_3$ | 0.483 | (1) | (1) |
| 5 | 50.0 | 0.50 | " | 0.965 | 1.706 | 1.551 |
| 6 | 50.0 | 1.00 | " | 1.932 | (1) | (1) |
| 7(2) | 49.5 | 1.00 | $Ba(OH)_2 \cdot 8H_2O$ | 0.951 | 0.934(2) | 0.885 |
| 8(2) | 49.5 | 0.50 | " | 1.547 | 1.221(2) | 1.167 |
| 9 | 49.0 | 1.00 | $BaCl_2$ | (1) | (1) | (1) |

(1) Not weighed
(2) Slight amount of $Ba(OH)_2 \cdot 8H_2O$ may not have dissolved; also, solution B for these two runs was boiled for 106 hours at atmospheric pressure prior to treatment with the barium compound.

As a comparison, it should be noted that a run corresponding to Example 9 was made except that calcium hydroxide was used instead of barium chloride. The calcium hydroxide dissolved, but no precipitate was observed.

As indicated above, the solution of glyoxylic acid may be passed over an anion-exchanging resin of the slightly basic type, on which it abandons its sulfuric acid. The resulting effluent may then, after its glyoxylic acid concentration has been readjusted, be reutilized directly for a new absorption operation.

The anion-exchanging resin used to eliminate the $H_2SO_4$ is preferably a slightly basic resin, i.e., a resin containing amine groups, e.g., the condensation prod-

EXAMPLE 10

This example illustrates absorption of residual gases originating from sulfuric acid production with the following composition:

$SO_2$ concentration—2.85 g/$m^3$
$SO_3$ concentration—0.18 g/m

The absorber consists of a column provided in its lower part with a plate of fritted glass, for introducing the gases and containing a 20% aqueous solution by weight of glyoxylic acid, 650 mm tall and 50 mm in diameter for a volume of 1,275 $cm^3$ of solution containing 284 g of pure glyoxylic acid. During absorption, the flow-rate of the gas is maintained practically constant, while temperature varies from 15° to 20° C. Upon $SO_2$-saturation, the quantities absorbed for each of the gases (after approximately 100 hours) were:

$SO_2$—290 g
$SO_3$—18.3 g

Upon leaving the absorber, the gases contain almost no more $SO_2$ and $SO_3$.

The saturated solution is desorbed by heating at atmospheric pressure and at 103° C., avoiding losses of water by entrainment, and the desorbed solution is used once again for another gas-absorption operation under the same conditions as before, and so on. After 4 complete absorption and desorption cycles, with the $H_2SO_4$-concentration threshold almost reached, the desorbed glyoxylic solution is processed to eliminate the sulfuric acid. To this end, it is passed for one hour over a column containing approximately 500 cm$^3$ of IMAC A 27 resin (epoxy-polyamine condensate) in its basic form, then washed with a small quantity of water which is combined with the initial effluent. In this way, 1,570 g are recovered of a solution containing 17.2% by weight of glyoxylic acid and 0.05% of sulfuric acid. The glyoxylic acid loss is 5%.

The concentration of the solution is readjusted to 20% glyoxylic acid by adding a 50% solution of glyoxylic acid, and the solution thereby obtained is reutilized for subsequent absorption and desorption cycles.

The resin is regenerated by passing it through 1,250 cm$^3$ of a 5% aqueous solution of sodium carbonate, then washed in bipermuted water until the pH of the effluent reaches 7.2, whereupon the resin is raised by an ascending stream of bipermuted water, allowed to settle, and is once more ready for use.

A partial test conducted with a gas having a stronger concentration of $SO_2$ and $SO_3$, namely:

$SO_2$—5.7 g/m$^3$
$SO_3$—1.7 g/m$^3$ using the same equipment, showed that after 48 hours, the gases exiting from the absorber contained:

$SO_2$—0.002 g/m$^3$
$SO_3$—0.17 g/m$^3$

The foregoing reveals the gist of the present invention and specific embodiments thereof so that others of ordinary skill in this art may use various adaptations thereof which should and are intended to be comprehended within the meaning and range of equivalents of the following claims.

We claim:

1. A process for the removal of sulfur dioxide and sulfur trioxide from an industrial gas which process comprises:
   (a) passing the industrial gas at a temperature between about 50° C. and about 1000° C. to a cooling zone to cool the gas to a temperature between about 20° C. and about 40° C.;
   (b) passing the industrial gas at a temperature between about 20° C. and about 40° C. through an absorption zone in contact with an absorbent composition stream comprising from about 10% to about 25% glyoxylic acid and from about 90% to about 75% water;
   (c) absorbing sulfur dioxide and sulfur trioxide in said absorbent composition;
   (d) passing the absorbent composition containing absorbed sulfur dioxide and absorbed sulfur trioxide as sulfuric acid to a stripping zone and stripping absorbed sulfur dioxide from the absorbent composition stream;
   (e) removing from the stripping zone stripped aqueous glyoxylic acid solution containing sulfuric acid;
   (f) removing sulfuric acid from the stripped aqueous glyoxylic acid solution by contacting the solution with a sulfuric acid removing agent; and
   (g) passing the aqueous glyoxylic acid solution to the absorption zone of step (b).

2. A process for the extraction of sulfur dioxide and sulfur trioxide from gases containing sulfur dioxide and sulfur trioxide, which process comprises contacting the gas with an aqueous solution of glyoxylic acid to absorb sulfur dioxide and sulfur trioxide in said aqueous solution, removing the sulfur dioxide from the aqueous glyoxylic acid solution by heating to strip the sulfur dioxide as a vapor from the aqueous glyoxylic acid solution, and thereafter removing absorbed sulfur trioxide by contacting the stripped aqueous glyoxylic acid solution with a barium compound more soluble than barium sulfate in the glyoxylic acid solution, the barium compound being essentially inert to the glyoxylic acid and being present in an amount effective to precipitate barium sulfate from the aqueous glyoxylic acid solution.

* * * * *